US011392978B2

(12) United States Patent
White

(10) Patent No.: US 11,392,978 B2

(45) **Date of Patent: *Jul. 19, 2022**

(54) DEVICE WITH RULE BASED OFFERS

(71) Applicant: Visa International Service Association, San Francisco, CA (US)

(72) Inventor: David White, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,221

(22) Filed: Aug. 18, 2020

(65) Prior Publication Data

US 2020/0380551 A1 Dec. 3, 2020

Related U.S. Application Data

(63) Continuation of application No. 15/130,760, filed on Apr. 15, 2016, now Pat. No. 10,796,331.

(51) Int. Cl.

*G06Q 30/00* (2012.01)
*G06Q 30/02* (2012.01)

(52) U.S. Cl.

CPC ......... *G06Q 30/0235* (2013.01); *G06Q 30/00* (2013.01); *G06Q 30/02* (2013.01); *G06Q 30/0207* (2013.01); *G06Q 30/0267* (2013.01)

(58) Field of Classification Search

CPC .... G06Q 30/0235; G06Q 30/02; G06Q 30/00; G06Q 30/0207; G06Q 30/0267

See application file for complete search history.

(56) References Cited

U.S. PATENT DOCUMENTS 7,324,957 B2 * 1/2008 Boys ...................... G06Q 30/02 705/14.36
7,870,022 B2 * 1/2011 Bous ...................... G06Q 30/02 705/14.34

(Continued)

OTHER PUBLICATIONS

"Remember the Kitchen of the Future? The One with Built-In Intelligence That Would Know When the Milk Expired and Order a Fresh Carton, Play Music While the Dishwashe . . . ", Canadian Press Newswire, Available online at: https://dialog.proquest.com/professional/docview/359543856?accountid=131444, Apr. 9, 2003.

(Continued)

*Primary Examiner* — Dipen M Patel

(74) *Attorney, Agent, or Firm* — Kilpatrick Townsend & Stockton LLP

(57) ABSTRACT

A decentralized offer management system is described. An appliance may be capable of storing and managing offers related to the appliance without communication with a central server. The appliance may receive and store offer attributes related to offers received from an offer provider computer. When a user utilizes their user device to communicate with the appliance, the appliance may determine offers related to the stored offer attributes that can be provided to the user. In some cases, the offers may be specific to the appliance or specific to the user. The appliance may send an offer to the user device, where the offer may indicate that the user is to perform certain actions to qualify to redeem the offer. The appliance may verify that the user has performed such actions before enabling the offer to be redeemed.

20 Claims, 5 Drawing Sheets

OFFER PROVIDER COMPUTER 101
1 Send offer attributes
2 Send qualification notice
APPLIANCE 110
DATA PROCESSOR 111
NETWORK INTERFACE 112
MEMORY ELEMENT 120
OFFER ATTRIBUTES 125A
OFFER ATTRIBUTES 125B
OFFER ATTRIBUTES 125N
REDEEMED OFFER VALUE DATA 128
USER DEVICE 102
3 Present offer
4 Accept offer
COMPUTER READABLE MEDIUM 130
OFFER RULES ENGINE 132
OFFER DISTRIBUTION MODULE 134
REDEMPTION MODULE 136
100

(56) References Cited

U.S. PATENT DOCUMENTS 9,294,575 B1 * 3/2016 Cronin ................ H04L 12/2823
2002/0010627 A1 1/2002 Lerat
2002/0042743 A1 4/2002 Ortiz et al.
2004/0137886 A1 7/2004 Ross et al.
2006/0047573 A1 3/2006 Mitchell et al.
2006/0089876 A1 4/2006 Boys
2008/0065488 A1 3/2008 Schwagmann et al.
2008/0262928 A1 * 10/2008 Michaelis .............. G06Q 30/02 705/14.39
2009/0259574 A1 10/2009 Thomsen et al.
2010/0122274 A1 * 5/2010 Gillies ............... H04N 21/2542 725/2
2012/0190386 A1 7/2012 Anderson
2012/0296716 A1 * 11/2012 Barbeau ................. G06Q 30/02 705/14.13
2013/0103537 A1 4/2013 Hewett
2013/0204690 A1 8/2013 Liebmann
2013/0214935 A1 8/2013 Kim et al.
2013/0217333 A1 8/2013 Sprigg et al.
2013/0339113 A1 12/2013 Junger
2014/0278954 A1 9/2014 Suzuki et al.
2014/0039990 A1 12/2014 Georgi
2015/0112838 A1 4/2015 Li et al.
2015/0170256 A1 6/2015 Pettyjohn et al.
2015/0201439 A1 7/2015 Park et al.
2015/0278870 A1 * 10/2015 Priebatsch ......... G06Q 30/0267 705/14.64
2016/0358443 A1 12/2016 True

OTHER PUBLICATIONS

Extended European Search Report dated Mar. 28, 2019 for Application No. EP17782817.5, 7 pages.
International Search Report and Written Opinion dated Jun. 30, 2017 for Application No. PCT/US2017/023655, 11 pages.
Written Opinion dated Jan. 21, 2020 for Application No. SG11201806365U, 7 pages.

* cited by examiner

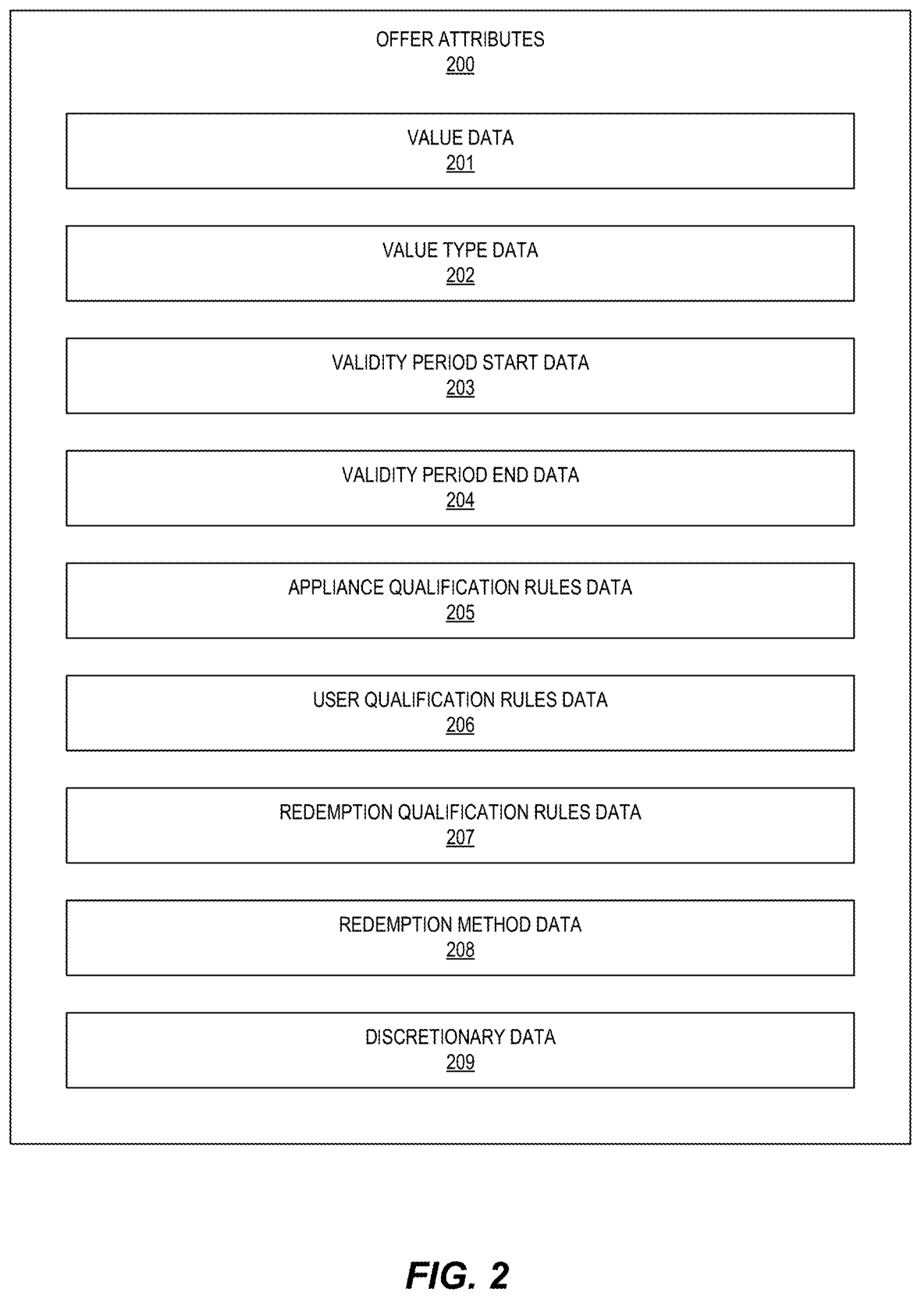

OFFER ATTRIBUTES
200

VALUE DATA
201

VALUE TYPE DATA
202

VALIDITY PERIOD START DATA
203

VALIDITY PERIOD END DATA
204

APPLIANCE QUALIFICATION RULES DATA
205

USER QUALIFICATION RULES DATA
206

REDEMPTION QUALIFICATION RULES DATA
207

REDEMPTION METHOD DATA
208

DISCRETIONARY DATA
209

FIG. 2

DEVICE WITH RULE BASED OFFERS

CROSS-REFERENCES TO RELATED APPLICATIONS

The present application is a continuation of U.S. patent application Ser. No. 15/130,760, filed Apr. 15, 2016 the entire contents of which are herein incorporated by reference for all purposes.

BACKGROUND

Management of offers can be cumbersome. Physical offers, such as paper coupons, can be easy to misplace. Additionally, a user may forget when the offer expires and may unnecessarily hold on to the paper coupon. Further, distribution of such paper offers can hinder the ability of resource providers to easily update the offers with new conditions.

Electronic offers can also present certain issues. For example, resource providers may have to maintain central servers and external databases that regulate offers for their various products. In some cases, when the central servers and external databases cannot be accessed, due to connectivity problems or other issues, offers may not be able to be appropriately provided to consumers. This is inefficient and can result in a loss of potential sales for the resource providers.

While the above-described architectures can be used, a number of improvements could be made.

Thus, new and enhanced methods for providing offers are needed. Embodiments of the invention address these and other problems, individually and collectively.

BRIEF SUMMARY

Embodiments of the invention are directed to systems and methods related to an appliance that may store and manage offers related to the appliance.

Embodiments of the invention are related to a method that can be performed by the appliance. The method may comprise receiving, from a server computer, offer attributes related to an offer associated with the appliance and storing the offer attributes related to the offer in the appliance. In some embodiments, the offer attributes stored by the appliance may be digitally signed by the server computer using a private key associated with the server computer. The method may further comprise sending the offer to a user device associated with a user. The method may further comprise receiving, from the user device, an indication that the user accepts the offer. Additionally, the method may comprise initiating redemption of the offer.

Initiating redemption of the offer may be performed in various ways. In some embodiments, initiating redemption of the offer may comprise sending a message to the server computer indicating that the user qualifies to redeem the offer. In some embodiments, initiating redemption of the offer may further comprise prior to sending the message, digitally signing the message using a private key associated with the appliance. The server computer may redeem the offer for the user. In other embodiments, initiating redemption of the offer may comprise storing the value of the offer in the appliance for later use.

In some embodiments, the method can further comprise receiving, from the user device, a request to establish a wireless connection and establishing a wireless connection with the user device. In some cases, the offer may be sent to the user device over the wireless connection.

In some cases, the offer may have a validity period. In some embodiments, the offer may be valid for a certain time period starting from the time at which the request to establish the wireless connection is received. This may enable the offer to be valid for the certain time period following the time at which the user showed interest in the appliance. In some cases, the offer may comprise a dynamic timer that indicates the amount of the time remaining of the certain time period.

In some embodiments, the appliance may evaluate rules to determine whether the appliance can provide the offer to the user and whether the user can redeem the offer. In some cases, the method can further comprise determining that the offer is applicable to the appliance based on appliance qualification rules, determining that the user qualifies to receive the offer based on user qualification rules, and determining that the user qualifies to redeem the offer based on redemption qualification rules. In some embodiments, the step of determining that the user qualifies to redeem the offer based on redemption qualification rules may comprise determining an action that is to be taken by the user to qualify the user to redeem the offer and verifying that the user performed the action.

These and other embodiments of the invention are described in further detail below.

BRIEF DESCRIPTION OF DRAWINGS

FIG. 2 shows an exemplary block diagram of offer attributes according to embodiments of the invention.

DETAILED DESCRIPTION

Figure 1:
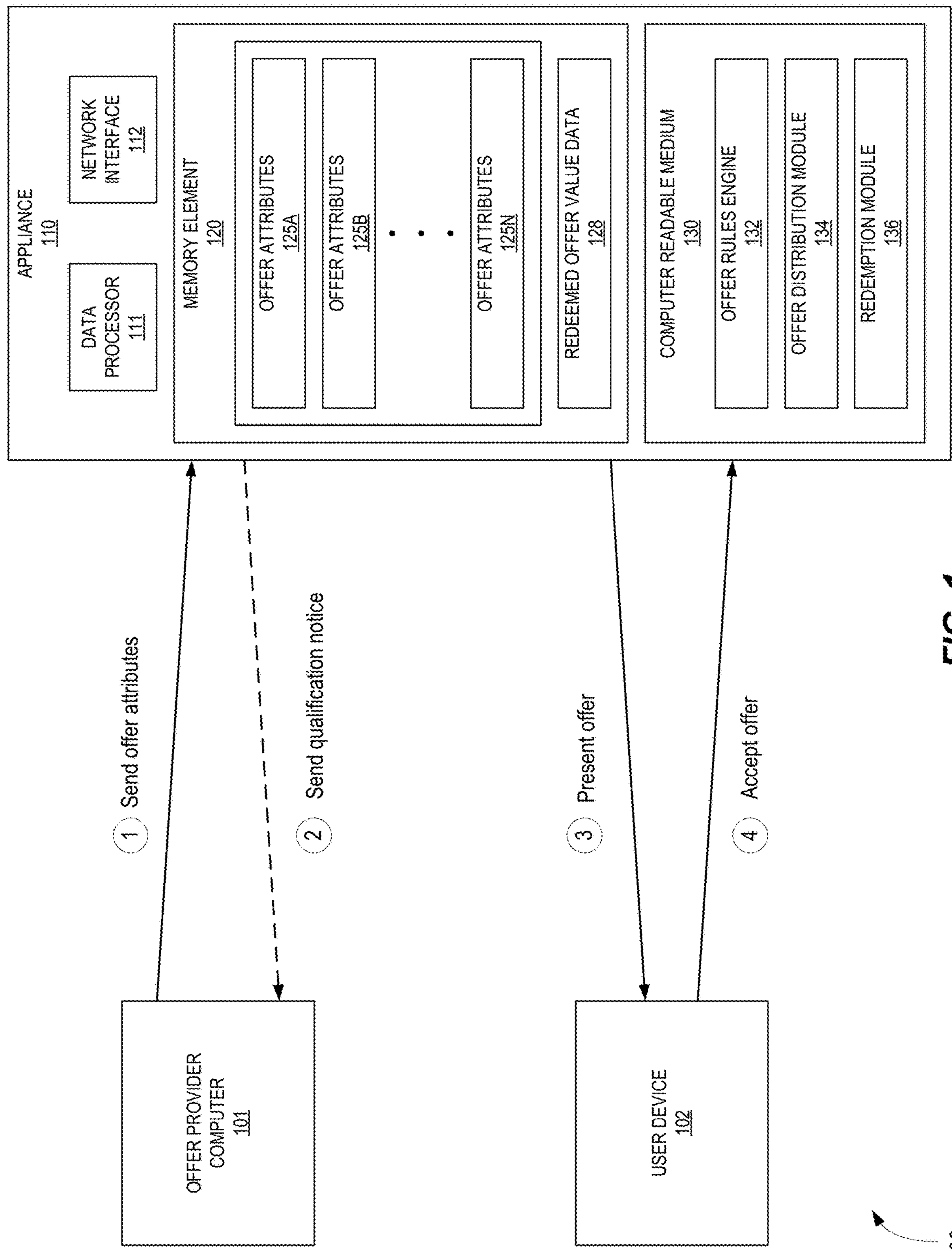
FIG. 1 shows an exemplary block diagram of a system according to embodiments of the invention.

Embodiments of the invention are directed to systems and methods related to an appliance that can store and manage offers. The offers may include generic offers, offers specific to the appliance, and offers related to a group of appliances. In some cases, the appliance may be any suitable device that comprises a processor, a memory element coupled to the processor, and a computer readable medium coupled to the processor. The appliance may receive offer attributes related to offers associated with the appliance from an offer provider computer (e.g., manufacturer computer, resource provider computer, etc.) and store the offer attributes. Offer attributes may include data for various characteristics related to offers and is described in more detail herein. In some embodiments, the offers can be specific to the appliance or specific to the user.

The appliance may further store an offer rules engine that can evaluate rules to determine whether the appliance can provide a certain offer to a particular user. In an exemplary case, the user may show interest in the appliance by using their user device to send to the appliance a request to establish a wireless connection. The appliance and the user device may then establish the wireless connection. The offer rules engine may evaluate rules to determine that an offer is applicable to the appliance and that the user is qualified to receive the offer. Subsequently, the appliance may send the offer to the user device over the established wireless connection. In some embodiments, there may be conditions that the user is to meet in order to redeem the received offer. In some cases, the conditions may indicate that an action is to be taken by the user to qualify the user to redeem the offer. The appliance may verify whether the action has been performed before enabling the user to redeem the offer. In some cases, the offer may enable the user to receive a discount when purchasing the appliance or receive other rewards.

It is noted that embodiments of the invention can be incorporated with other functionality of appliances in the Internet of Things (IOT) space. Certain appliances may be able to store and retrieve appliance data, including ownership, behavioral, and historical data, across multiple ownership transfers. Such appliances may enable a way to securely store data associated with an appliance. This may be achieved by having data stored by the appliance encrypted and only providing a decryption key to access the encrypted data to appropriate entities. For example, the owner of the appliance may have, by controlling which entities may possess decryption keys for certain data stored by the appliance, the right to access and make available certain data stored in the appliance, to control the appliance, to delegate the right to utilize the appliance, and to transfer the ownership of the appliance to a new owner. In some cases, appliance data stored in the appliance may be stored in an unalterable and sequential manner. Thus, even if a transfer of ownership takes place for the appliance, data already stored by the appliance may not be able to be changed by the new owner since the data may be locked during the change in ownership. Further details of an appliance that can securely store and retrieve data as described above can be found in U.S. Non-Provisional application Ser. No. 14/967,066, "Device using Secure Storage and Retrieval of Data," which is hereby incorporated by reference in its entirety for all purposes.

In such appliances that can securely store and retrieve data as described above, information related to offers as described in embodiments of the invention can also be stored by the appliance in a similarly secure manner. For example, offer attributes received from offer provider computers may be stored by the appliance upon permission of the owner of the appliance. Further, since each offer provider computer may sign offer attributes that are stored by the appliance, the offer attributes may be unalterable by other entities once stored by the appliance. Securely storing the offer attributes in the appliance can enable the owner of the appliance to view when and by which entity certain offer attributes were added to the appliance. Further, the appliance may securely store confirmation that certain offers were redeemed by an owner of the appliance, such that the current owner of the appliance may be able to determine the offers that a past owner of the appliance redeemed.

Prior to discussing embodiments of the invention, description of some terms may be helpful in understanding embodiments of the invention.

An "offer" may be a proposal. In some cases, the offer may be a written proposal that may be sent electronically to a device. In some embodiments, the offer may comprise a certain value to be provided to a user, where the value may be related to a monetary amount or other currency value. For example, the offer may provide the user with a discount of a certain amount (e.g., "30% off of original price") or an addition of a certain number of loyalty points. In other cases, the offer may not be related to a monetary transactions. For example, the offer may provide the user with an amount of time or access privileges. In some cases, the offer may further comprise certain conditions that are to be fulfilled by the user in order for the user to receive the value of the offer. In one example, a condition related to the offer may be that the user is to complete a certain action within a certain time period (e.g., "Purchase item within 30 minutes to get 100 loyalty points").

"Offer attributes" may be data related to characteristics of offers. In some embodiments, an offer may be associated with multiple offer attributes. Some exemplary offer attributes include data indicating the value, currency type, and start and end of the validity period of an offer. In some cases, an offer attribute may indicate that it is a dynamic value. For example, offer attributes may indicate that the value of an offer and the validity period of an offer may vary in certain cases. The offer attributes may also comprise data related to rules, such as appliance qualification rules, user qualification rules, and redemption qualification rules, associated with conditions related to an offer. Such rules can help determine whether an offer is to be provided to a certain user, as well as whether the user is able to redeem an offer. The offer attributes may also include data related to a redemption method compatible with an offer. The offer attributes may further comprise any other data that may be utilized to process an offer.

An "appliance" may be an object comprising a data processor that can communicate with other devices. The appliance may include a memory element coupled to the processor, and a computer readable medium coupled to the processor. The computer readable medium may include code that is executable by the processor, for implementing methods described herein. An appliance may be capable of communicating over a network with any suitable computing device. In some embodiments, the appliance may store offer attributes related to one or more offers. In some cases, the offers may be related to the appliance. The appliance may also store an offer rules engine to evaluate rules that can be utilized to determine whether an offer is applicable to the appliance, whether an offer can be provided to a user, and whether the offer can be redeemed by the user. In some cases, the user may accept the offer and choose to utilize the value of the offer at a later time. In this case, the appliance may further store the value of the offer for later use.

In some embodiments, an appliance can be a device that is designed to perform a specific task. For example, an appliance can be a refrigerator where the primary function of the refrigerator is to keep food preserved or a thermostat where the primary function of the thermostat is to control the temperature within a dwelling. In some cases, an appliance may be a machine that can perform a domestic task. For example, the appliance may be a thermostat, washing machine, a drying machine, a microwave, a toaster, a blender, a refrigerator, or other device that may be found around a residence. However, embodiments are not so limited, as the appliance may also be any other type of suitable device with wireless communication capabilities. Other examples of appliances include televisions, certain mobile devices such as wearable devices (e.g., smart watches, fitness bands, jewelry, etc.), and automobiles with remote communication capabilities.

The "offer provider" may be an entity that enables presentation of offers. In some embodiments, the offer provider may be a manufacturer, a resource providing entity, or other entity related to an appliance. The offer provider may be associated with an offer provider computer, which may be a server computer that can generate offer attributes associated with offers and send them to an appliance over a communications network.

A "server computer" may typically be a powerful computer or cluster of computers. For example, the server computer can be a large mainframe, a minicomputer cluster, or a group of servers functioning as a unit. The server computer may be associated with an entity such as a payment processing network, a merchant, an authentication cloud, an acquirer, or an issuer.

A "resource providing entity" may be an entity that makes resources available to a user. A resource providing entity may also be known as a resource provider. Examples of resource providing entities include distributors, merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). At the physical locations, the resource providing entity may host an access device. In some embodiments, resource providing entities may make available physical items (e.g., goods, products, appliances, etc.) to the user. In other embodiments, resource providing entities may make available digital resources (e.g., electronic documents, electronic files, etc.) or time (e.g., rental time, use time, etc.) to the user. In other embodiments, resource providing entities may manage access to certain resources by the user.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device, a cardholder device, a user device, a consumer device, a server computing device, an appliance, and any computer may be exemplary types of computing devices.

FIG. 1 shows an exemplary block diagram 100 of a system according to embodiments of the invention. FIG. 1 includes an offer provider computer 101, user device 102, and appliance 110, which may all be in communication with each other by any suitable communications network. In some cases, user device 102 may comprise one or more applications (not shown) associated with offer provider computer 101, a digital wallet, or a resource providing entity.

Offer provider computer 101 may be a server computer associated with an offer provider. In some embodiments, the offer provider may be a manufacturer, a resource providing entity, or other entity related to appliance 110. Offer provider computer 101 may comprise a processor, a memory coupled to the processor, and a computer-readable medium coupled to the processor. The computer-readable medium may include code that is executable by the processor, for implementing methods described herein. Offer provider computer 101 may comprise a network interface that enables communication with other devices, such as appliance 101 and user device 102. Offer provider computer 101 may enable generation of offer attributes and transmission of offer attributes to appliance 110. In some cases, offer provider computer 101 may host an application that can be utilized on user device 102.

In some embodiments, offer provider computer 101 may have the capability to encrypt and decrypt information. For example, offer provider computer 101 may store a key pair (not shown), such as a public-private key pair, associated with offer provider computer 101 to utilize for encryption and decryption processes. Offer provider computer 101 may digitally sign offer attributes before sending the offer attributes to appliance 110. This may help to ensure that the offer attributes cannot be inappropriately tampered with after they are stored by appliance 110.

User device 102 may be a computing device operated by a user. User device 102 may be capable of communicating information with other devices, such as offer provider computer 101 and appliance 110. User device 102 can include a processor, a memory, input devices, and output devices, operatively coupled to the processor. Some non-limiting examples of user device 102 may include mobile devices (e.g., cellular phones, keychain devices, personal digital assistants (PDAs), pagers, notebooks, laptops, notepads, wearable devices (e.g., smart watches, fitness bands, jewelry, etc.), automobiles with remote communication capabilities, personal computers, and the like. In some embodiments, user device 102 may store a key pair (not shown), such as a public-private key pair, associated with user device 102 to utilize for encryption and decryption processes.

In some embodiments, user device 102 may include an application (e.g., resource providing entity application, wallet application, etc.) stored in a memory or secure element of user device 102. In some cases, the application may be a mobile application. In some embodiments, the application may display an interface that allows the user to view and accept an offer.

Appliance 110 may be any suitable computing device that can communicate with offer provider computer 101 and user device 110. Appliance 110 may include a data processor 111, a network interface 112, a memory element 120, and a computer readable medium 130. In some embodiments, appliance 110 may store a key pair (not shown), such as a public-private key pair, associated with appliance 110 to utilize for encryption and decryption processes. Appliance 110 may be powered by batteries, by an external power source, or both. In some embodiments, data stored by appliance 110 may be associated with a timestamp corresponding to the time at which the data was stored. In some embodiments, the data may be encrypted by one or more entities (e.g., offer provider computer 101, appliance 110, user device associated with owner of appliance 110, etc.) before being stored by appliance 110.

Data processor 111 (e.g., microprocessor) may process functions of appliance 110. Data processor 111 may include hardware within appliance 110 that can carry out instructions embodied as code in computer-readable medium 130. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Network interface 112 may be any suitable combination of hardware and software that enables data to be transferred to and from appliance 110. Network interface 112 may enable appliance 110 to communicate data to and from another device (e.g., offer provider computer 101, user device 102, etc.). Some examples of network interface 112 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 112 may include Wi-Fi™.

Data transferred via network interface 112 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 112 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Memory element 120 may comprise offer attributes 125A through 125N, where each set of attributes may be associated with a different offer. The numbering of the offer attributes as 125A through 125N is not meant to be limiting and instead shows that memory element 120 may store offer attributes for any suitable number of offers. A description of offer attributes 125A is described below. A similar description may also be applied to offer attributes 125B through offer attributes 125N.

Offer attributes 125A may be data related to an offer associated with appliance 110. In some embodiments, offer attributes 125A may be generated by offer provider computer 101 and stored by appliance 110. Offer attributes 125A may include data indicating the value, currency type, and start and end of the validity period of the offer associated with appliance 110. Offer attributes 125A may also comprise data related to rules, such as appliance qualification rules, user qualification rules, and redemption qualification rules, associated with conditions related to the offer. Such rules can help determine whether the offer is applicable to the appliance, whether the offer is to be provided to a certain user, as well as whether the user can redeem the offer. Offer attributes 125A may further include data related to a redemption method compatible with the offer. Further details about the information stored by offer attributes for an offer are described with respect to FIG. 2.

In some embodiments, memory element 120 may comprise redeemed offer value data 128. Redeemed offer value data 128 may comprise information related to the value of an offer that appliance 110 determines can be redeemed by the user. Appliance 110 may store redeemed offer value data 128 for offers that are associated with a redemption method that involves storing the value of an offer in appliance 110 for later use. Redeemed offer value data 128 may comprise coupons, rewards, loyalty points, or other value data. In some embodiments, redeemed offer value data 128 may store a digital currency amount in a digital currency wallet.

While not shown in FIG. 1, memory element 120 may store any suitable additional information related to appliance 110. For example, the additional information may include background information related to appliance 110, such as a description, price, date manufactured, manufacturer name, serial number, product number, an identifier, and other information. In some embodiments, memory element 120 may store ownership information related to appliance 110, such as identification of the current owner and past owners of appliance 110, and details related to transfers of ownership of appliance 110.

Computer readable medium 130 may include an offer rules engine 132, an offer distribution module 134, and a redemption module 136. Other modules and submodules may also reside on computer readable medium 130. Examples of additional modules may include modules for processing and routing messages, communicating with other devices, data extraction (e.g., for retrieving data from external data sources such as databases) modules, storage modules, encryption modules, and message modification modules. Each module in appliance 110 may be combined with any of the additional modules as appropriate. Each module in appliance 110 may comprise one or submodules, where each submodule may comprise one or more functions implemented by code, executable by data processor 111.

Offer rules engine 132 may comprise code that may enable, in conjunction with data processor 111, evaluation of rules associated with an offer. As described above, offer attributes for an offer may comprise various rules, such as appliance qualification rules, user qualification rules, and redemption qualification rules. Upon appliance 110 establishing a wireless connection with user device 102, offer rules engine 132 may determine, with data processor 111, whether appliance 110 may provide certain offers to the user associated with user device 102 based on conditions indicated in the appliance qualification rules and the user qualification rules.

Offer rules engine 132 may evaluate, with data processor 111, appliance qualification rules to determine whether an offer is applicable to appliance 110. One exemplary type of offer that may be applicable to appliance 110 is an offer that is specific to appliance 110. Another exemplary type of offer that may be applicable to appliance 110 is an offer that relates to a broader group of appliances comprising appliance 110. Offer rules engine 132 may determine, with data processor 111, offers that are specific to appliance 110 and offers that are related to a broader group of appliances comprising appliance 110 based on information related to appliance 110. Specific examples of offers that may be applicable to an appliance, such as appliance 110, are described in further detail with respect to FIG. 2.

In some embodiments, offer rules engine 132 may determine, with data processor 111, offers that are expired and may indicate their expired status in a suitable manner. For example, offer rules engine 132 may recognize whether certain offers are expired by determining whether the end of the validity period of the offer has passed. Offer rules engine 132 may flag the expired offers as no longer valid by updating the offer attributes of each of the expired offers to indicate their expired status, or may store information indicating the offers are expired elsewhere in appliance 110.

Offer rules engine 132 may further evaluate, with data processor 111, user qualification rules to determine whether an offer may be provided to a user. One exemplary type of offer that may be provided to the user is an offer that is specific to the user. Another exemplary type of offer that may be provided to the user is an offer that relates to a broader group of users including the user. Offer rules engine 132 may determine, with data processor 111, offers that may be provided to the user based on information related to the user (e.g., user account identifiers, user device identifiers, etc.) received from user device 102. Specific examples of offers that may be provided to a user are described in further detail with respect to FIG. 2.

After determining an offer that can be provided to the user, offer rules engine 132 may initiate, with data processor 111, communication of the determined offer to another module of appliance 110 for transmission of the offers. For example, offer rules engine 132 may send, with data processor 111, an indication of the determined offer to offer distribution module 134. In some cases, offer rules engine 132 may also send, in conjunction with data processor 111, information identifying user device 102 to offer distribution module 134 to indicate to which device to send the offer. While an exemplary case in which one offer qualifies to be sent to the user for simplicity, embodiments are not so limited. In some cases, multiple offers may qualify to be sent to the user.

Offer distribution module 134 may enable, in conjunction with data processor 111, presentation of the offer to the user. Offer distribution module 134 may determine, with data processor 111, the device to which to send the offer, based on information received from offer rules engine 132. Offer distribution module 134 may detect, with data processor 111, that user device 102 has established a wireless connection with appliance 110. Offer distribution module 134 may send, in conjunction with data processor 111, the offer to user device 102 over the wireless connection.

Referring back to offer rules engine 132, offer rules engine 132 may also enable, with data processor 111, appliance 110 to determine whether the user can redeem the offer sent to user device 102. Offer rules engine 132 may determine, with data processor 111, whether the user can redeem the offer based on conditions indicated in the redemption qualification rules.

Offer rules engine 132 may enable, in conjunction with data processor 111, evaluation of redemption qualification rules. Evaluation of redemption qualification rules may help determine whether the user qualifies to redeem the offer based on whether the user fulfills certain conditions associated with redemption of the offer. In some embodiments, determining that the user qualifies to redeem the offer based on redemption qualification rules comprises determining an action that is to be taken by the user to qualify the user to redeem the offer and verifying that the user performed the action. If the user is qualified to redeem the offer, offer rules engine 132 may send, with data processor 111, an indication that the offer can be redeemed by the user to redemption module 136.

Redemption module 136 may comprise code that may enable, in conjunction with data processor 111, processing related to redemption of the offer. Redemption module 136 may receive, with data processor 111, an indication from offer rules engine 132 that the user is qualified to redeem an offer. Redemption module 136 may then determine, with data processor 111, a redemption method compatible with the offer based on offer attributes associated with the offer. Subsequently, redemption module 136 may initiate, with data processor 111, redemption based on the determined redemption method.

There may be several ways in which the offer can be redeemed. In one example, the offer may be associated with a redemption method involving the offer provider. In this case, redemption module 136 may send, with data processor 111, a message to offer provider computer 101 to request redemption of the offer for the user upon determination that the user qualifies to redeem the offer. In another example, the offer may be associated with a redemption method comprising storing the offer value in appliance 110 for later use. In this case, redemption module 136 may determine, with data processor 111, value data of the offer based on offer attributes of the offer and may store, in conjunction with data processor 111, the value (e.g., digital currency, loyalty points, etc.) indicated by the value data in appliance 110 as part of redeemed offer value data 128.

In some embodiments, functionality of appliance 110, such as wireless communication and offer management, may be activated in different ways. In one exemplary case, such functionality may be turned on whenever appliance 110 is powered by batteries or an external power source. In some cases, appliance 110 may be powered, but such functionality may not be turned on until the owner of appliance 110 (e.g., by manufacturer before shipping appliance 110, by resource provider before placing appliance 110 for sale, etc.) manually turns on the functionality. For example, the owner may enter or send an activation code to appliance 110, which may cause appliance 110 to enable the functionality. It is understood that such functionality may also be turned off by the owner of appliance 110 in a similar manner. For example, the owner may enter or send an de-activation code to appliance 110, which may cause appliance 110 to disable the functionality.

FIG. 2 shows an exemplary block diagram of offer attributes 200 according to embodiments of the invention. Offer attributes 200 may comprise value data 201, value type data 202, validity period start data 203, validity period end data 204, appliance qualification rules data 205, user qualification rules data 206, redemption qualification rules data 207, redemption method data 208, and discretionary data 209. In some embodiments, some of the types of data shown in offer attributes 200 may not comprise values or may have substitute values (e.g., null value). In some embodiments, offer attributes 200 may be associated with an offer generated by an offer provider computer associated with an offer provider. Offer attributes 200 may be stored in an appliance. While not shown in FIG. 1 or FIG. 2, in some cases, offer attributes may be digitally signed by the offer provider computer that generated the offer attributes before they are stored by the appliance.

The data shown in FIG. 2 is not a complete list of types of data that may be stored in offer attributes associated with an offer, but may serve as a representative sample. Embodiments of the invention do not place any constraints on offer attributes that may be stored and processed by the appliance.

Value data 201 may comprise information indicating a value of the offer. In some embodiments, value data 201 may indicate a monetary amount (e.g., discount of ten dollars), a percentage (e.g., discount of 30% off original price), a rewards amount (e.g., 10 loyalty points), or other bargains (e.g., "buy one get one free," etc.). In other embodiments, the offer may not be related to a financial transaction and value data 201 may indicate other values, such as an amount of time (e.g., 60 minutes) or a certain level of access to a resource.

In some embodiments, value data 201 may indicate that the value of the offer may change over time. For example, value data 201 may indicate that over time, the value of the offer may decrease. This may provide an incentive for a user too attempt to redeem the offer at an earlier time.

Value type data 202 may comprise information indicating a type of value associated with the offer. Value type data 202 may indicate the type of value indicated by value data 201 of the offer. In some embodiments, value type data 202 may indicate a type of currency, such as dollars, digital currency, or loyalty points. In other embodiments, value type data 202 may indicate that the value type is a unit of time (e.g., minutes).

Validity period start data 203 and validity period end data 204 may comprise information indicating the start and end of the time period for which the offer is valid, respectively. In some embodiments, validity period start data 203 and validity period end data 204 may each comprise a timestamp that indicates a date and time. In other embodiments, validity period start data 203 may indicate that the offer is valid starting at the occurrence of a certain event and validity period end data 204 may indicate that the offer is valid for a certain time period from validity period start data 203. For example, validity period start data 203 may be the time at which a user device requests to establish a wireless connection with the appliance and validity period end data 204 may indicate that the offer is valid for a certain time period (e.g., 30 minutes) after the time indicated by validity period start data 203.

Appliance qualification rules data 205 may comprise information indicating conditions under which the offer may be applicable to an appliance. For example, appliance qualifications rules data 205 may indicate that the offer is applicable to the appliance if the offer is specific to the appliance or related to a broader group of appliances comprising the appliance.

Some exemplary offers specific to the appliance are described below. Offers specific to the appliance may be associated with offer attributes that are determined based on certain characteristics of the appliance. For example, the appliance may be a "used" machine that was previously owned by another user. In some cases, the appliance may be damaged in some way that lowers its value (e.g., dented, discolored, etc.). Based on these characteristics, an offer specific to the appliance may comprise a greater discount than that of a generic discount offered by the offer provider. Such offers may provide a greater incentive for a user to purchase the appliance, despite it having defects or not being brand new. Other offers specific to the appliance may exist based on other characteristics of the appliance (e.g., popularity, time on market, original price, etc.).

Some exemplary offers related to a broader group of appliances comprising the appliance are described below. Offers related to a broader group of appliances comprising the appliance may be associated with offer attributes that are determined based on common characteristics amongst the broader group of appliances. Exemplary common characteristics may include a device type or a manufacturer. For example, the appliance may be a washing machine and thus an offer related to all washing machines may be applicable to the appliance. In this case, the offer may be for receiving a free box of washing powder with the purchase of the appliance. In another example, the appliance may be created by a certain manufacturer and thus an offer related to all devices created by the manufacturer may be applicable to the appliance. In this case, the offer may be for receiving a coupon that can be utilized with a purchase for another product made by the manufacturer. Other suitable offers may exist based on other common characteristics amongst the broader group of appliances (e.g., validity period, original price range, etc.).

In some cases, the broader group of appliances may comprise all appliances associated with a resource provider. For example, a resource provider may be having a store-wide sale and thus may be offering a discount associated with all of the appliances including the appliance. In this case, an offer comprising the discount may be applicable to the appliance.

User qualification rules data 206 may comprise information indicating conditions under which the offer may be provided to a user. For example, user qualification rules data 206 may indicate that the offer may be provided to the user if the offer is specific to the user or related to a broader group of users comprising the user.

Some exemplary offers specific to a user are described below. Offers specific to the user may be associated with offer attributes that are determined based on certain characteristics of the user. In one example, a user may have recently purchased a related product that may be utilized with the appliance, such as a drying machine where the appliance is a washing machine. In this case, the user may receive an offer that may have a larger discount than normal for the appliance to increase the chances that the user may choose to purchase the appliance. In another example, a user may be a new customer that has not made any purchases from the resource provider. In this case, the user may receive an offer that may have a larger discount than normal to increase the chances that the user may become a recurring customer.

Some exemplary offers related to a broader group of users including a user are described below. Offers related to a broader group of users including the user may be associated with offer attributes that are determined based on common characteristics amongst the users. Exemplary common characteristics may include a type of payment device, accepted currency type, or enrollment in membership accounts. For example, there may be an offer that is meant for users that utilize a payment card or digital wallet issued by a certain issuer. This may occur if the issuer has a relationship with the offer provider and would like to provide offers to their users. In another example, some offers may be meant for users that are capable of accepting a certain type of currency, such as loyalty points or digital currency. In another example, there may be an offer that is meant for users that have a membership account with the offer provider (e.g., resource provider) associated with the appliance. Other suitable offers may exist based on other common characteristics amongst the broader group of users (e.g., method of payment, returning customers, etc.).

It is noted that while there may be offers that are meant for users that have a membership account, the lack of a membership account does not bar a user from receiving all offers associated with a membership account. In some embodiments, the user may receive an offer for receiving loyalty points, even if the user does not yet have a membership account to receive such loyalty points. For example, the user may accept the offer and subsequently, during redemption of the offer, the user may be automatically signed up for a membership account. Appliance 110 may send a request to generate the membership account to the resource provider computer, which may then generate the membership account for the user and credit the loyalty points indicated by the offer into the new account. This can forgo the need for the user to conduct a process to create a new membership account at a separate time, which can be cumbersome.

In some embodiments, user qualification rules data 206 may indicate whether the user qualifies for an offer based on previous offers that the user has received from the appliance. For example, the appliance may store information related to user devices (e.g., user device identifiers) with which the appliance has previously established a wireless connection. Thus, the appliance may be able to recognize the user device associated with the user when it establishes a wireless connection with the appliance at another time. In some cases, the appliance may utilize this information to determine the offers that the user device has previously received and ensure that the user device does not receive the previously received offers again. It is understood that in some cases, the appliance may recognize that the user associated with the user device already received an offer on a different user device by determining that the user devices are running the same user account associated with the user. In such cases, the appliance may determine that the user may not receive the previously received offer despite utilizing a different user device.

In some embodiments, user qualification rules data 206 may indicate whether the user qualifies for an offer based on data shared amongst appliances. For example, user qualification rules data 206 may indicate that a user may not receive a certain offer from an appliance, if the user has already received the same offer from another appliance. Appliances may share information to other appliances that indicates a mapping of offers provided to certain users or user devices. The appliance may thus utilize this information to determine whether the user has already received an offer from another appliance and if so, determine that the user does not qualify to receive the offer again. This may prevent users from being able to receive the same offer multiple times by simply using their user device to communicate with different appliances. In other embodiments, the appliances may access the mapping of offers provided to certain users or user devices by communicating with a database associated with a remote server at which the mapping may be stored.

Redemption qualification rules data 207 may comprise information indicating conditions under which a user may redeem an offer. In some cases, redemption qualification rules data 207 may indicate that the user is to perform a certain action in order to qualify to redeem the offer. In some embodiments, redemption qualification rules data 207 may indicate that the action is to be performed within a certain time period, such as before the time indicated by validity period end data 204.

Some exemplary conditions for qualifying to redeem an offer are described. In one example, the action may comprise the user purchasing the appliance within a certain time period. In some other examples, the action may comprise purchasing another item with the appliance (e.g., "buy item A with appliance," etc.), creating a new membership account with the resource provider (e.g., "Sign up for a membership account"), sending a recommendation for the appliance to another user (e.g., "Recommend appliance to a friend," etc.), or connecting on social media sites associated with the resource provider (e.g., "Become our friend on Facebook," "Like our page," etc.). Other suitable conditions may be utilized to determine whether the user may redeem the offer. In some embodiments, redemption qualification rules data 207 may indicate that the user is to complete multiple actions in order to qualify to redeem the offer.

Redemption method data 208 may comprise information indicating how the offer may be redeemed. There may be several ways in which the offer can be redeemed. In one example, redemption method data 208 may indicate that the offer may be redeemed by a process involving the offer provider computer. Redemption method data 208 may indicate that a message may be sent to the offer provider computer (e.g., resource provider computer) indicating the user qualifies to redeem the offer. In another example, redemption method data 208 may indicate that the value of the offer is to be stored in the appliance for later use. In some embodiments, redemption method data 208 may also indicate any information that may be utilized to process redemption of the offer.

Discretionary data 209 may comprise any other additional data related to the offer that may be utilized for processing the offer. In some cases, discretionary data 209 may include information related to the offer provider computer that generated offer attributes 200, such as an offer provider identifier, name, or location. In some cases, discretionary data 209 may include information surrounding generation of attributes 200, such as date and time generated.

Referring back to FIG. 1, an exemplary flow diagram related to providing an offer to a user device of a user is shown by steps 1 through 4. Certain steps shown in FIG. 1 are described with respect with to FIG. 3 through FIG. 5. The flow diagram includes offer provider computer 101, user device 102, and appliance 110, which may be in communication by any suitable communications network. It is understood that for any steps involving a decryption process utilizing a public key, the public key may be obtained through a publicly accessible interface or may be received from the entity that conducted the corresponding encryption process (e.g., in a message).

For the exemplary flow diagram, offer provider computer 101 may be a resource provider computer associated with a resource provider for appliance 110. In the exemplary flow, the resource provider may be the owner of appliance 110 and may make available appliance 110 at a physical location (e.g., store). While a specific example is described with respect to FIG. 1, it is understood that a similar flow diagram may apply to cases in which offer provider computer 101 is associated with a different entity. For example, in some cases, offer provider computer 101 may be associated with an aggregator (e.g., processing network) that may aggregate offers from various entities and make the offers available to appliance 110.

At step 1, offer provider computer 101 associated with an offer provider may generate and send offer attributes associated with an offer to appliance 110. Subsequently, offer provider computer 101 may store the received offer attributes in its memory. In this exemplary case, offer provider computer 101 may send offer attributes 125B to appliance 110. Appliance 110 may already have stored offer attributes related to other offers (e.g., offer attributes 125A, offer attributes 125N, etc.). As described with respect to FIG. 2, offer attributes may be any information related to the offer.

In some embodiments, offer provider computer 101 may digitally sign offer attributes 125B sent to appliance 110. This may allow appliance 110 to verify the validity of the received offer attributes 125B, prior to storing them, by decrypting the signed offer attributes 125E using the public key associated with offer provider computer 101. Appliance 110 may store the offer attributes if appliance 110 verifies that the offer attributes are valid.

While an exemplary case in which offer attributes related to a single offer are sent to appliance 110 is described for simplicity, embodiments are not so limited. For example, offer provider computer 101 may send offer attributes for multiple offers to appliance 110 in parallel or in sequence.

In some embodiments, there may be multiple offer provider computers (not shown) that send offer attributes to appliance 110. In addition to offer provider computer 101, which may be the resource provider computer, another offer provider computer may be a manufacturer computer associated with the manufacturer of appliance 110. The manufacturer computer may send offer attributes generated by the manufacturer computer to appliance 110. In some cases, the manufacturer computer may send offer attributes to appliance 110 while in possession of or owning appliance 110. However, manufacturer computer may still send offer attributes to appliance 110 after a transfer of ownership of appliance 110 to the resource provider with permission of the resource provider. Accordingly, offer attributes may be pushed to appliance 110 from any suitable offer provider computers, with permission of the owner of appliance 110. In some cases, appliance 110 may comprise rules indicating whether offers received from certain offer provider computers may be passed on to the user.

At step 2, appliance 110 may send a qualification notice to offer provider computer 101. The qualification notice may be a message generated by appliance 110 after user device 102 communicates with appliance 110 that includes information indicating whether the offer associated with the received offer attributes is applicable to appliance 110 and is meant to be sent to a certain user. If appliance 110 determines that the offer attributes 125B qualify to be provided by appliance 110 to the user, the offer may be sent to user device 102 associated with the user at step 3. It is noted that the transmission of the qualification notice is optional and thus in some cases, the offer may be sent to user device 102 without the qualification notice being sent to offer provider computer 101. An exemplary determination process of whether the received offer attributes, offer attributes 125B in this case, qualify to be provided by appliance 110 to a user is described in more detail with respect to FIG. 3.

Figure 3:
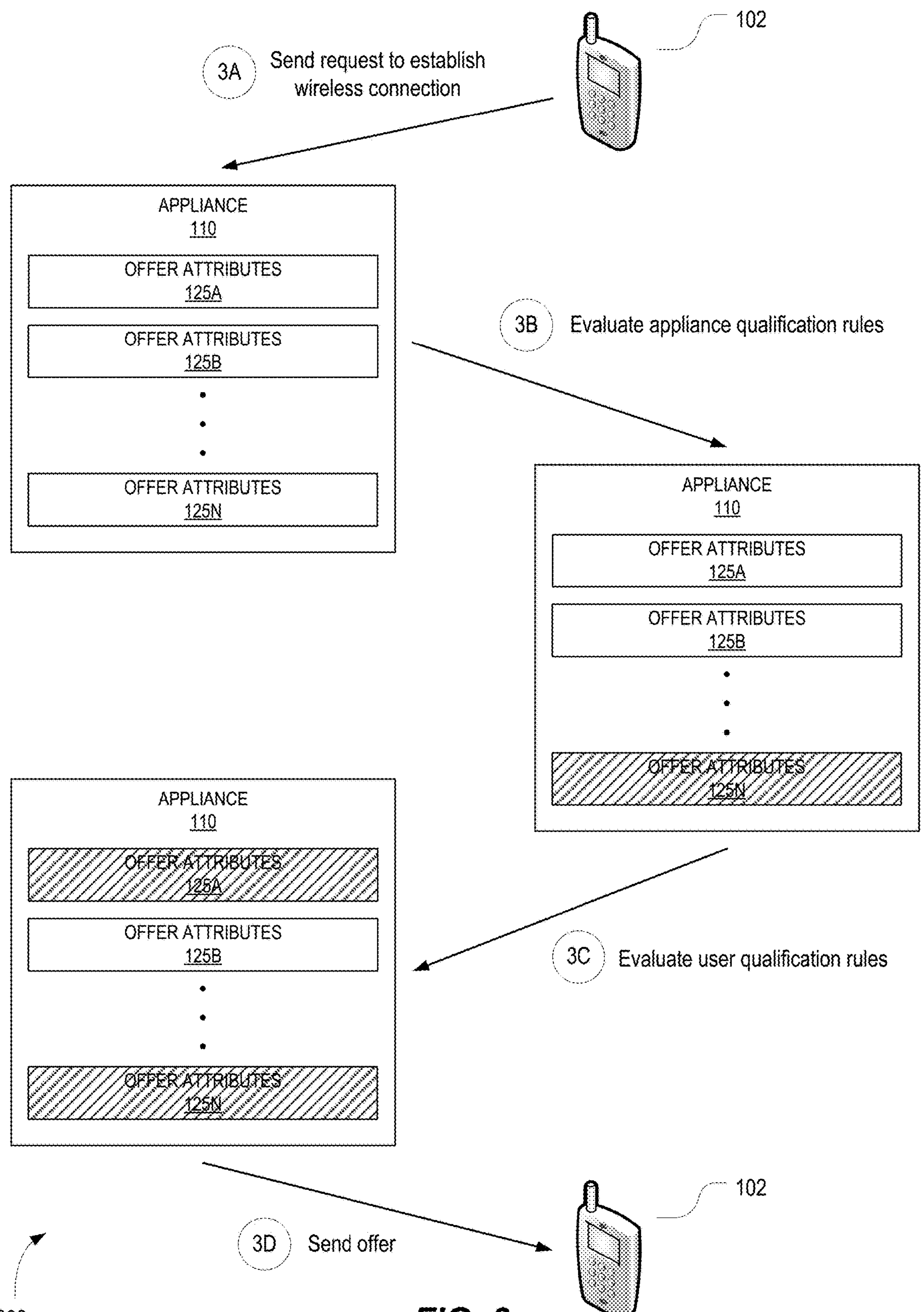
FIG. 3 shows an exemplary flow diagram for presentation of an offer according to embodiments of the invention.

FIG. 3 shows an exemplary flow diagram 300 for presentation of an offer according to embodiments of the invention. FIG. 3 includes appliance 110 and user device 102 operated by the user. Not all components of and data stored by appliance 110 is shown in FIG. 3 for simplicity.

In this exemplary case, the user may be physically present at the resource provider location at which appliance 110 may reside. For example, the resource provider location may be a store at which the user may be browsing to purchase an appliance. In some embodiments, appliance 110 may be displayed such that the user may directly see appliance 110. In this case, appliance 110 may be powered by batteries or plugged in to an external power source to enable functionality, such as wireless communication and offer management, of appliance 110. In other embodiments, the user may not directly see appliance 110, such as when appliance 110 is packaged in a box. In this case, appliance 110 may not be connected to an external power source, but may be powered by batteries to enable such functionality of appliance 110.

At step 3A, user device 102 may send a request to establish a wireless connection with appliance 110. In some embodiments, the request may indicate that the user has showed interest in appliance 110. In one exemplary case, the user may utilize user device 102 to scan a NFC tag associated with appliance 110. This may cause user device 102 to run a mobile application that can communicate information to and from appliance 110. For example, an identifier associated with appliance 110 may be sent from appliance 110 to the mobile application, which may cause user device 102 to request communication over a network with appliance 110. A wireless connection may then be established between appliance 110 and user device 102. The mobile application may receive and display information surrounding appliance 110, such as a description, price, reviews, and other details. Other suitable methods for initiating communication with appliance 110 may be utilized, such as scanning a QR code or bar code associated with appliance 110, or entering a product code, product number, or serial number associated with appliance 110 into the mobile application.

In some embodiments, information related to the user and user device 102 may be sent from user device 102 to appliance 110 upon establishing the wireless connection. In some cases, the information may include any of a user identifier (e.g., a name), a device identifier, a username utilized with the mobile application, an account identifier associated with a membership account with the resource provider, and other information. This information may help appliance 110 to determine specific offers that can be provided to the user.

At step 3B, appliance 110 may evaluate appliance qualification rules for offer attributes associated with each offer against information related to appliance 110. As described above with respect to FIG. 2, appliance qualification rules may comprise information indicating conditions under which an offer may be applicable to an appliance. In this exemplary case depicted in FIG. 3, appliance 110 may determine that offers associated with offer attributes 125A and offer attributes 125B are applicable to appliance 110. For example, offer attributes 125A may be related to an offer specific to appliance 110, while offer attributes 125B may be related to an offer meant for appliances of the same type as appliance 110. The shading of offer attributes 125N indicates that appliance 110 determined that the offer associated with offer attributes 125N is not applicable to appliance 110. In some embodiments, appliance 110 may not store some offer attributes that are not applicable to appliance 110, which may forgo or reduce processing conducted in step 3B.

At step 3C, appliance 110 may evaluate user qualification rules for offer attributes associated with each offer against information related to the user. As described above with respect to FIG. 2, user qualification rules may comprise information indicating conditions under which the offer may be provided to a user. For efficiency, appliance 110 may evaluate user qualification rules just for offer attributes related to offers that were determined to be applicable to appliance 110 in step 3.

In this exemplary case depicted in FIG. 3, appliance 110 may determine that the offer associated with offer attributes 125B may be provided to the user. For example, user qualification rules may indicate that the offer is meant for users that have a membership account with the resource provider. Appliance 110 may determine that since the user associated with user device 102 has a membership account with the resource provider based on information received from user device 102, the offer associated with offer attributes 1253 may be provided to the user. The shading of offer attributes 125A indicates that appliance 110 determined that the offer associated with offer attributes 125A may not be provided to the user. While not explicitly described with respect to step 3B and step 3C, appliance 110 may determine that other offer attributes stored by appliance 110 that are not shown in FIG. 3 may not be provided to the user based on the appliance qualification rules and user qualification rules.

At step 3D, appliance 110 may send an offer to user device 102. In the exemplary case described with respect to FIG. 3, this offer may be related to offer attributes 125B, which may be meant for appliances of the same type as appliance 110 and for users that have a membership account with the resource provider. Appliance 110 may send the offer to user device 102 over the wireless connection established in step 3A. In some cases, the offer may be sent to user device 102 as a message comprising text that indicates certain offer attributes related to the offer. In cases in which certain actions are to be taken by the user in order to qualify to redeem the offer, the actions may be clearly indicated in the displayed offer. An exemplary display of an offer may be described with respect to FIG. 5.

Figure 5:
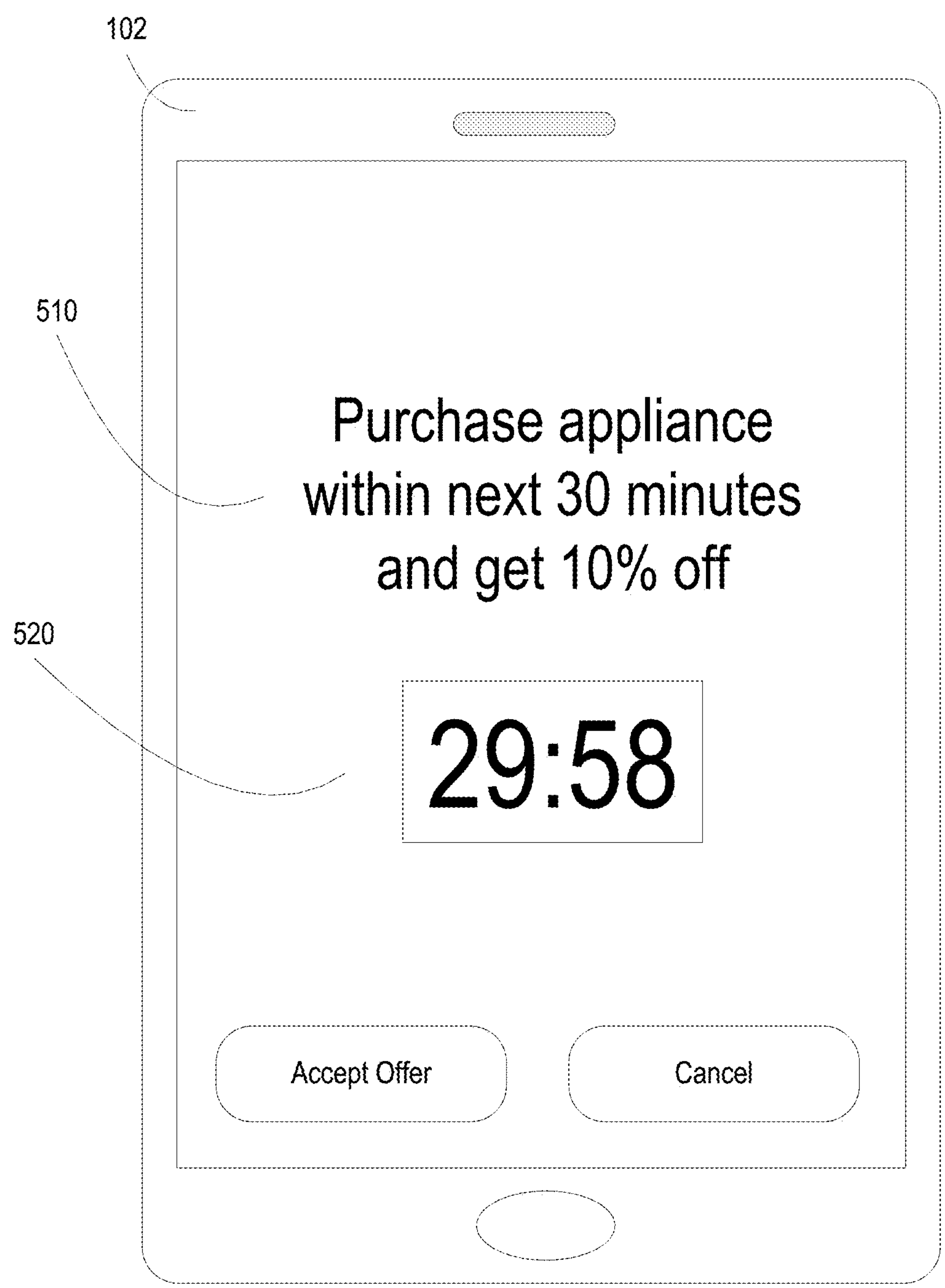
FIG. 5 shows an exemplary interface for displaying an offer on a user device according to embodiments of the invention.

FIG. 5 shows an exemplary interface for displaying an offer on user device 102 according to embodiments of the invention. The offer may be related to offer attributes stored by an appliance, such as offer attributes 125B stored by appliance 110, as described with respect to FIG. 1. User device 102 may display text 510, such as "Purchase appliance within next 30 minutes and get 10% off." In some embodiments, text 510 may indicate the value of the offer (e.g., 10% off) and any conditions related to the offer (e.g., purchase within 30 minutes).

The timer indicator 520 may dynamically display the time remaining for the time limit associated with the offer. Offer attributes 125B may indicate that the validity period end date for the offer is 30 minutes from the time at which user device 102 requests to establish a wireless connection with appliance 110. As shown in FIG. 5, timer 520 may display the time remaining in the 30 minute limit (e.g., count down from 30 minutes to 0 minutes). In other embodiments, timer indicator 520 may display the time elapsed since the user device 102 received the offer (e.g., count up from 0 minutes to 30 minutes). While one exemplary format of timer indicator 520 is shown in FIG. 5, any suitable format may be utilized for timer indicator 520 to display time. For example, the timer indicator 520 may further display milliseconds.

The time displayed by timer indicator 520 may be verified in several ways. In one embodiment, appliance 110 may itself comprise an internal clock that can establish the current time and record the amount of time elapsed. In another embodiment, appliance 110 may periodically request the current time from other devices, such as user device 102 or the resource provider computer. In another embodiment, appliance 110 may communicate with a remote server computer to periodically request the current time over a network.

Referring back to FIG. 1, at step 4, user device 102 may send a response to appliance 110 indicating acceptance of the received offer upon determining that the user accepted the offer. In some cases, user device 102 may receive input from the user indicating whether the user accepts the offer. For example, the user may click the "Accept Offer" button or "Cancel" button as shown in the interface of FIG. 5, which may cause an instruction to be sent to user device 102 indicating that the user accepts or declines the offer, respectively. Any other suitable input may be provided by the user to user device 102 to indicate acceptance of the offer. For example, the user may activate hardware buttons or input voice commands, biometric data, and motion commands to accept the offer. In some embodiments, the user may not need to explicitly accept the offer in order to redeem the offer, which is described in more detail below.

Subsequently, appliance 110 may determine whether the user is qualified to redeem the offer. If the user is qualified to redeem the offer, appliance 110 may initiate a redemption process for the offer. An exemplary determination process of whether the user qualifies to redeem the offer, as well as the redemption process, is described in more detail with respect to FIG. 4.

Figure 4:
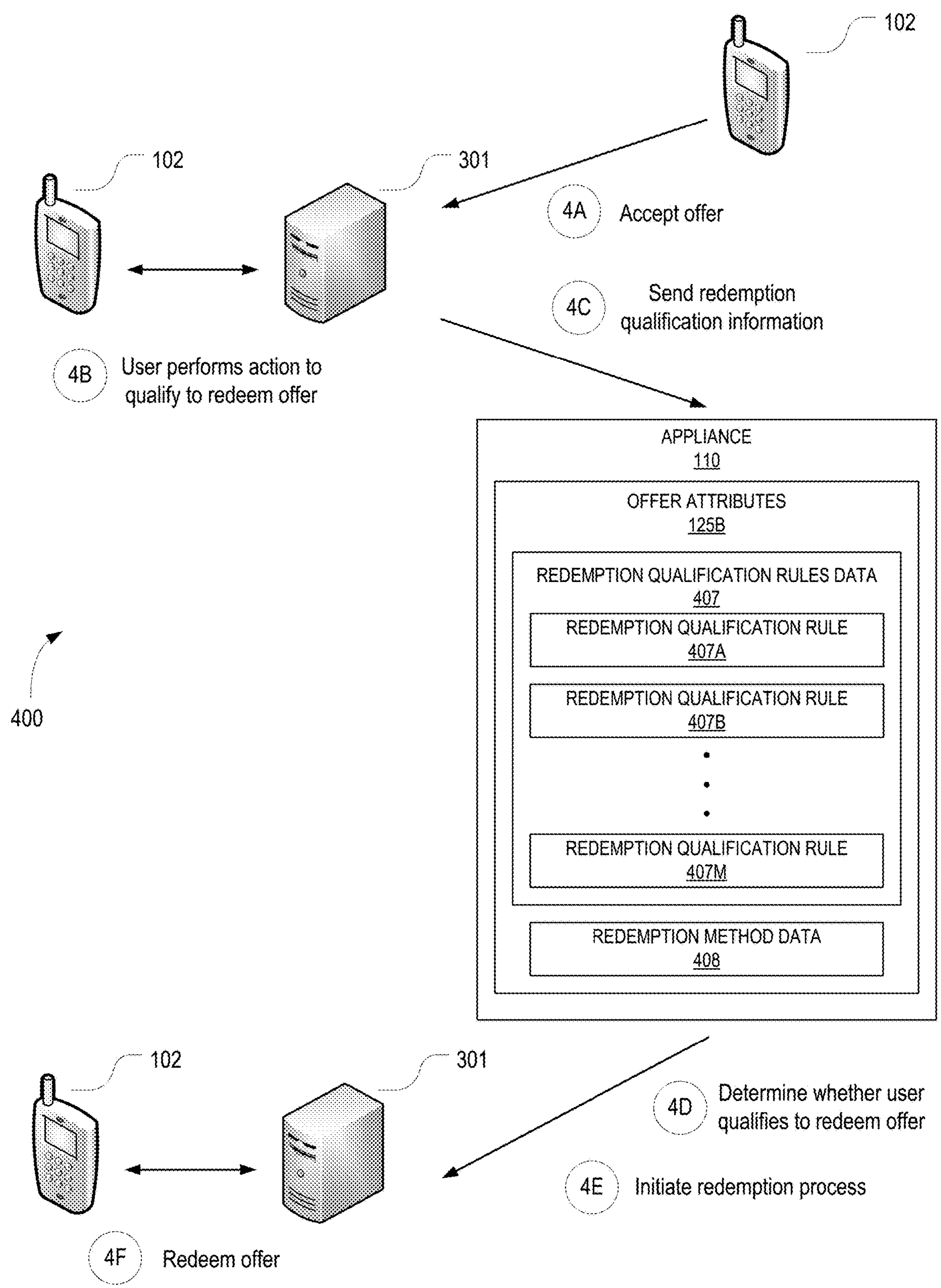
FIG. 4 shows an exemplary flow diagram for redemption of an offer according to embodiments of the invention.

FIG. 4 shows an exemplary flow diagram 400 for redemption of an offer according to embodiments of the invention. FIG. 4 includes user device 102 associated with the user, appliance 110, and a resource provider computer 301 associated with the resource provider. Appliance 110 may store offer attributes 125B, as described in FIG. 1 and FIG. 3. Certain components of appliance 110 are not shown in FIG. 4 for simplicity. In this exemplary case, resource provider computer 301 may also be the offer provider computer, such as offer provider computer 101 in FIG. 1, and the offer accepted by the user may correspond to the displayed offer in FIG. 5.

Offer attributes 125B may comprise redemption qualification rules data 407 and redemption method data 408. Redemption qualification rules data 407 may comprise redemption qualification rule 407A through redemption qualification rule 407M. The numbering of the redemption qualification rules as 407A through 407M is not meant to be limiting and instead shows that offer attributes 125B may store any suitable number of redemption qualification rules. In this exemplary case, the redemption qualification rules data 407 may comprise a rule that indicates that the user is to purchase appliance 110 within 30 minutes in order to qualify for redemption of the offer (see FIG. 5).

At step 4A, the user may accept the offer received by user device 102. For example, the user may activate a software button (e.g., "Accept offer") displayed by user device 102. In some embodiments, this may cause the mobile application on user device 102 to display instructions to the user to perform a transaction at a checkout register associated with the resource provider, in order to qualify to redeem the offer.

At step 4B, the user may perform an action in order to qualify to redeem the offer. In this case, the action may be to conduct a transaction with resource provider computer 301 to purchase appliance 110 within 30 minutes. The user may go to a point-of-sale terminal at the resource provider location at which the user may initiate a transaction to purchase appliance 110. The user may conduct the transaction with user device 102 (e.g., by using a payment interface on the mobile application).

At step 4C, user device 102 may send redemption qualification information to appliance 110. The redemption qualification information may include information that indicates that the user fulfilled the conditions associated with qualifying for redemption of the offer. For example, the information may include a confirmation of purchase received by user device 102 from resource provider computer 301. In some embodiments, user device 102 may digitally sign the redemption qualification information with its private key and send the signed redemption qualification information to appliance 110.

At step 4D, appliance 110 may determine whether the user qualifies to redeem the offer based on evaluating the redemption qualification rules. Appliance 110 may determine what action is to be taken by the user to qualify the user to redeem the offer and verify whether the user successfully performed the action. Appliance 110 may determine that the action to qualify to redeem the offer comprises the user purchasing appliance 110 within 30 minutes, as indicated by the redemption qualification rules data 407.

If the redemption qualification information is encrypted by user device 102 in step 4C, appliance 110 may first decrypt the redemption qualification information using the public key associated with user device 102 to ensure that the redemption qualification information is valid. Appliance 110 may then verify whether the user performed the action by analyzing the decrypted redemption qualification information received from user device 102. For example, appliance 110 may determine, based on the redemption qualification information, that the time elapsed between the time at which user device 102 and appliance 110 established a wireless connection and the time at which the user initiated a transaction to purchase appliance 110 has not exceeded 30 minutes.

At step 4E, upon determining that the user is qualified to redeem the offer, appliance 110 may initiate a redemption process. The redemption process may be conducted using a method indicated in redemption method data 408 of offer attributes 125B. As described above with respect to FIG. 2, redemption method data 408 may comprise information indicating how the offer associated with offer attributes 125B may be redeemed. Appliance 110 may determine the redemption method for the offer indicated by redemption method 408. In this exemplary case, redemption method data 408 may indicate that the offer may be redeemed by sending a message requesting redemption of the offer to the offer provider computer, which may be resource provider computer 301.

Accordingly, appliance 110 may send resource provider computer 301 the message comprising the request to redeem the offer for the user. The message may comprise information related to the offer, such as the offer attributes for the offer stored by appliance 110 and an indication that the user qualifies to redeem the offer. In some embodiments, appliance 110 may digitally sign the message with its private key and then send the message to resource provider computer 301. Upon receipt of the message, resource provider computer 301 may decrypt the message using the public key of appliance 110 to verify the authenticity of the message. This can allow resource provider computer 301 to ensure, before proceeding with the redemption process, that appliance 110 determined that the user qualifies to redeem the offer. Resource provider computer 301 may subsequently allow the user to receive the offer associated with the offer attributes, which may be a 10% discount to be applied to the purchase of appliance 110.

In some embodiments, the user may receive a prompt by user device 102 whether to continue with the redemption process for the offer. If the user confirms to continue, the redemption process may proceed. If the user declines to continue, the redemption process may be cancelled. However, the transaction may not be terminated, as the transaction may proceed to be processed as a normal transaction without applying the offer. In other embodiments, the redemption of the offer may be proceed without providing a prompt to the user.

At step 4F, the offer may be redeemed for the user. For example, resource provider computer 301 may apply the value of the offer to the transaction for purchasing appliance 110. Consequently, the user may receive the 10% discount for their purchase of appliance 110. In some cases, appliance 110 may send a notification indicating successful redemption of the offer to user device 102. Appliance 110 may also store information indicating that the offer is no longer valid, since the offer has been redeemed. In some cases, the information may further indicate background information related to the redemption process, such as when, where, and how the offer was redeemed.

In some embodiments, resource provider computer 301 may send information to be stored by appliance 110 indicating that appliance 110 was purchased by the user. For example, resource provider computer 301 may send a signed code to appliance 110 indicating that the user now owns appliance 110.

While the embodiment above describes 4D and 4E as using separate messages, embodiments are not so limited. For example, appliance 110 may include information related to the offer in a message sent to resource provider computer 301, where the message may include a request to verify whether the user performed actions to qualify to redeem the offer and to redeem the offer if the user qualifies. Thus, in some cases, upon verification that the user qualifies, resource provider computer 301 may proceed to redeem the offer for the user without returning a confirmation to appliance 110 that the user qualifies for redemption.

While the embodiment above describes a redemption method involving communication with the offer provider computer (e.g., resource provider computer 301), embodiments are not so limited. In another exemplary case, the user may receive an offer in which the redemption method comprises storing the value of the offer in appliance 110 for later use in redeemed offer value data 128, as described with respect to FIG. 1. In this case, after the user qualifies to redeem the offer, the value of the offer may be stored in appliance 110 and may be designated for later use by the user.

In one exemplary case, the offer may comprise providing a certain amount of loyalty points, such as 10,000 points, to the user's loyalty points account with the resource provider. The 10,000 loyalty points may be stored by appliance 110 and may be utilized by the user at a later time. For example, following redemption of the offer, the user may own appliance 110. While utilizing appliance 110 at home, the user may utilize user device 102 to request appliance 110 to transfer a certain number of the loyalty points to their loyalty points account, so that they may utilize the points for a transaction.

In another exemplary case, the offer may comprise providing a certain amount of digital currency to the user's digital currency account. The amount of digital currency may be stored by a digital currency wallet stored in appliance 110 and may be utilized by the user at a later time. For example, following redemption of the offer, the user may own appliance 110. While utilizing appliance 110 at home, the user may utilize user device 102 to request appliance 110 to transfer a certain amount of the digital currency to their digital currency wallet on user device 102, so that they may utilize the digital currency for a transaction.

While an exemplary case in which user device 102 receives one offer from appliance 110 is described above, embodiments are not so limited. For example, appliance 110 may determine that a plurality of offers may be provided by appliance 110 to the user. In some cases, appliance 110 may send the plurality of offers to user device 102. In other cases, appliance 110 may select a portion of the plurality of offers and send the selected offers to user device 102. Appliance 110 may determine whether the user qualifies to redeem each of the plurality of offers sent to user device 102 in a method similar to that described above.

While not required, in some embodiments, appliance 110 may determine a priority order of offers. This may enable appliance 110 to prioritize certain offers to be sent to user device 102 when only a portion of the multiple offers that qualify to be presented by appliance 110 to the user are sent to user device 102. In some cases, offers that are specific to appliance 110 may be prioritized over more generic offers associated with appliance 110. In addition, offers that are specific to the user may be prioritized over more generic offers associated with the user. This can allow offers that are more focused on appliance 110 and the user to be provided to the user. Such offers may be more likely to be effective in convincing the user to redeem the offers. In some cases, this can result in a greater chance for a transaction associated with the offer to be completed by the user, which is beneficial to the resource provider.

In some embodiments, appliance 110 may provide offers in a randomized manner. For example, amongst the users that qualify to receive a certain offer, appliance 110 may send the offer to only a portion of the qualified users at random. This may help reduce the predictability of receiving certain offers and also reduce the capability for users to attempt to receive and reuse offers beyond their original intent. In addition, such randomized distribution of offers may encourage users to respond to an attractive offer, since they know that they may not receive it again.

While an exemplary case in which the transaction for appliance 110 is conducted at the resource provider location, embodiments are not so limited. For example, the user may conduct the purchase remotely through a website or application associated with the resource provider. In this case, the user may utilize user device 102 to request to establish a wireless connection by inputting information specific to appliance 110 into user device 102. For example, the user may scan a QR code or bar code on a magazine, which may enable user device 102 to receive an identifier unique to appliance 110. In other cases, the user may input a product number or serial number unique to appliance 110 into user device 102. User device 102 may then contact appliance 110 with the request and the wireless connection may be established between appliance 110 and user device 102.

For such remote transactions, the offer may be configured in such a way that the user does not explicitly accept the offer (e.g., by pressing an "Accept offer" button). In other words, once the offer is received at user device 102, the user may proceed to perform the action in order to qualify to redeem the offer. For example, instead of an "Accept offer" button, the displayed offer may comprise a "Buy appliance now" button. The user can activate the "Buy appliance now" button, which can open up a payment interface on user device 102 to enable the transaction to be initiated.

Subsequently, a similar process for providing and redeeming an offer may be performed as described above. Some offers may be associated with rules related to whether the transaction is an in-person transaction or a remote transaction. For example, certain offers may be available for users performing in-person transaction that may not be available for those performing remote transactions, or vice versa. In some cases, geo-position information associated with the location of user device 102 may be utilized to determine whether the user is conducting an in-person or remote transaction.

In other embodiments, the user may receive offers after they have already purchased appliance 110. In one exemplary case, the user may have appliance 110 newly installed at their home after purchasing appliance 110. The user may register as the new owner of appliance 110 through the mobile application on their user device 102, which can then request to establish a wireless connection with appliance 110. Appliance 110 and user device 102 may then establish the wireless connection and appliance 110 may send an offer to user device 102 over the wireless connection. For example, appliance 110 may be a washing machine and the offer may be a discount for a related item, such as washing powder. In another example, the offer may be a discount for a product created by the same manufacturer as that of the washing machine. If the user qualifies to redeem the offer, the offer may be redeemed as appropriate. During the time that the user owns appliance 110, the user may continue to periodically receive offers from appliance 110.

While offers provided in a financial context are described above, embodiments are not so limited. In some cases, the offers may be related to providing a certain amount of time, such as for a time-regulated rental or use of an appliance. In one exemplary case, appliance 110 may be a motor vehicle that can store and manage offers related to how long a user may test drive the motor vehicle. The motor vehicle may be in a showroom associated with a resource provider, where the user may utilize their user device 102 to retrieve details associated with the motor vehicle. The motor vehicle may receive information related to the user based on communications with user device 102 and may determine whether the user may qualify for any offers. In one example, the motor vehicle may determine that the user is qualified to receive an offer to test the motor vehicle over the span of multiple days, rather than for a typical shorter period of time, such as a couple hours. The user may qualify for this offer based on the information that the user has a membership account with the resource provider, which may indicate that the user has previously purchased a motor vehicle of the same type.

The motor vehicle may then send the offer to user device 102 comprising some conditions and then determine whether the user has met these conditions before allowing the user to redeem the offer. For example, the offer may comprise the condition, "Accept this offer within an hour in order to test the vehicle for two days." In some cases, the user may then accept the offer by their user device 102. If the motor vehicle determines that the user accepted the offer within one hour as indicated by the conditions associated with the offer, the motor vehicle may then enable the user to redeem the offer by sending a message to the resource provider computer indicating that the user qualifies for the offer. The resource provider computer may then redeem the offer and initiate the redemption process to enable the user to test the motor vehicle for two days. For example, the resource provider computer may display the message received by the motor vehicle and an agent operating the resource provider computer may confirm the testing period offered to the user.

Embodiments of the invention provide several benefits. While typical systems for providing offers may rely on a central server that manages the offers and provides the offers to users, embodiments of the invention forgo the need to rely on functionality of a central server. This is because while embodiments of the invention can allow offer attributes to be stored at a central server as backup data, an appliance does not have to be connected to the central system in order to provide an electronic offer to a user. Once the appliance has stored offer attributes in its system, it can use logic to determine which offers associated with the offer attributes can be provided to certain users and send the appropriate offers to user devices over a communications network. This is useful as the offer providing capability of the appliance is not limited by the reliability of the central server. This is especially useful as the central server may not be reliable due to connectivity problems, data synchronization issues, or other issues. In some cases, the issues related to the central server may be exacerbated by high use of computing resources (e.g., processing power, storage, etc.) for managing the offers, which can cause the whole computer system run more inefficiently. Thus, decentralizing the capability of offer management to appliances results in a more efficient overall system.

Another advantage provided by embodiments of the invention is that details of an offer and its redemption may remain stored in the appliance. This can provide a useful record for later use by a user, resource provider, or financial institution. For example, the data stored by the appliance may provide the user with contextual information regarding offers redeemed by past owners. Further, the information stored by the appliance can also be utilized by the resource provider computer when the user returns the appliance. Further, the information stored by the appliance may also serve as a proof of a payment amount by the user to a financial institution.

Another advantage provided by embodiments of the invention is that offers originating from different entities may be managed by the appliance itself. For example, the appliance may receive offer attributes generated by multiple offer provider computers, such as a manufacturer computer associated with the manufacturer of the appliance and a resource provider computer associated with the resource provider (e.g., retailer) of the appliance. The appliance may store the offer attributes received from each offer provider computer and provide them to the user device of the user.

This is convenient for the user, in contrast to typical systems in which offers related to multiple entities may be provided to the user in different contexts and mediums. For example, in a typical system, the user may receive an offer originating from the resource provider on a website associated with the resource provider, but may receive an offer originating from the manufacturer in a user manual pamphlet that is associated with the appliance. Embodiments of the invention enable offers originating from different entities to be easily viewed by the user in one location through their user device. Further, this may reduce the chance that the user is not made aware of an offer that the user is qualified to receive. In some cases, providing more offers relevant to the user may increase the incentive for the user to complete a transaction for the appliance, which may benefit the resource provider associated with the appliance.

Additional methods and processes may be included within the above methods and may be recognized by one of ordinary skill in the art, in light of the description herein. Further, in some embodiments of the present invention, the described methods herein may be combined, mixed, and matched, as one of ordinary skill would recognize.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server computer comprising:

a processor;

a memory coupled to the processor; and a computer-readable medium coupled to the processor, including code that, when executed by the processor, causes the server computer to:

generate offer attributes related to an offer associated with a household appliance and user qualification rules associated with the offer, wherein the offer is a one-time offer to sell the household appliance, the offer being based on one or more appliance qualification rules of the offer attributes;

digitally sign the offer attributes using a private key associated with the server computer;

transmit, to the household appliance over a wide area network, the offer attributes and the user qualification rules associated with the offer;

wherein the household appliance, without communication with the server computer:

verifies, using a public key associated with the server computer, an authenticity of the offer attributes and stores, in a memory of the household appliance upon verification, the offer attributes related to the offer, establishes a short-range wireless connection between a user device associated with a user and the household appliance and receives information related to the user and the user device, determines, by applying the user qualification rules associated with the offer to the information related to the user and the user device, that the offer should be presented to the user, transmits the offer to the user device associated with the user via the short-range wireless connection, and receives, from the user device via the short-range wireless connection, an indication that the user accepts the offer, and wherein the household appliance initiates redemption of the offer by sending a message requesting redemption of the offer to the server computer over the wide area network, where the message is digitally signed using a private key associated with the household appliance;

receive the message requesting redemption of the offer; and redeem the offer responsive to the message requesting redemption of the offer.

2. The server computer of claim 1, wherein:

the code further causes the server computer to:

decrypt the message requesting redemption of the offer using a public key of the household appliance to verify the authenticity of the message.

3. The server computer of claim 1, wherein the message requesting redemption of the offer comprises the offer attributes and an indication that the user qualifies to redeem the offer.

4. The server computer of claim 1, wherein the server computer is associated with a resource provider making the household appliance available for sale.

5. The server computer of claim 1, wherein the code further causes the server computer to:

receive, from the household appliance, information associated with the household appliance, wherein the server computer associates the offer with the household appliance by virtue of the information associated with the household appliance being in compliance with the one or more appliance qualification rules.

6. The server computer of claim 1, wherein the offer attributes include: information indicating a value of the offer and information indicating a time period for which the offer is valid.

7. A computer-implemented method comprising:

generating, by a server computer, offer attributes related to an offer associated with a household appliance and user qualification rules associated with the offer, wherein the offer is a one-time offer to sell the household appliance, the offer being based on one or more appliance qualification rules;

digitally signing, by the server computer, the offer attributes using a private key associated with the server computer;

transmitting, by the server computer to the household appliance over a wide area network, the offer attributes and the user qualification rules associated with the offer;

wherein the household appliance, without communication with the server computer:

verifies, using a public key associated with the server computer, an authenticity of the offer attributes and stores, in a memory of the household appliance upon verification, the offer attributes related to the offer, receives a request from a user device associated with a user to establish a short-range wireless connection with the household appliance and establishes the short-range wireless connection between the user device associated with the user and the household appliance, receives information related to the user and the user device, determines, by applying the user qualification rules associated with the offer to the information related to the user and the user device, that the offer should be presented to the user, transmits the offer to the user device associated with the user via the short-range wireless connection, and receives, from the user device via the short-range wireless connection, an indication that the user accepts the offer, and wherein the household appliance initiates redemption of the offer by sending a message requesting redemption of the offer to the server computer, where the message is digitally signed using a private key associated with the household appliance;

receiving, by the server computer, the message requesting redemption of the offer over the wide area network; and redeeming, by the server computer, the offer responsive to the message requesting redemption of the offer.

8. The method of claim 7, wherein the message requesting redemption of the offer comprises an indication that the user qualifies to redeem the offer, and the method further includes decrypting, by the server computer, the message requesting redemption of the offer using a public key of the household appliance to verify the authenticity of the message.

9. The method of claim 7, wherein the server computer is associated with a resource provider making the household appliance available for sale or a manufacturer of the household appliance.

10. The method of claim 7, further comprising:

receiving, by the server computer from the household appliance, information associated with the household appliance, wherein the server computer associates the offer with the household appliance by virtue of the information associated with the household appliance being in compliance with the one or more appliance qualification rules.

11. The method of claim 7, wherein the offer attributes include: information indicating a value of the offer and information indicating a time period for which the offer is valid.

12. A method, performed by a household appliance, comprising:

providing, to a server computer independent from receiving any information related to a user device associated with a user, information associated with the household appliance, the household appliance being a device configured to perform a domestic task, receiving, from the server computer, offer attributes related to an offer associated with the household appliance and user qualification rules associated with the offer, the offer being associated with the household appliance by virtue of the information associated with the household appliance being in compliance with one or more appliance qualification rules, wherein the offer is a one-time offer to sell the household appliance;

verifying an authenticity of the offer attributes and storing, in a memory of the household appliance upon verification, the offer attributes related to the offer in the household appliance and the user qualification rules associated with the offer, wherein the offer is stored within the memory comprising a plurality of offers for future distribution to one or more user devices;

without further communication with the server computer:

receiving, from the user device associated with the user, a request to establish a connection, the request initiated upon the user device being used to scan an identifier of the household appliance, establishing the connection between the user device associated with the user and the household appliance, receiving, from the user device via the established connection, information related to the user and the user device, determining, by applying the user qualification rules associated with the offer to the information related to the user and the user device, that the offer should be presented to the user, transmitting, via the connection, the offer to the user device associated with the user, receiving, from the user device, an indication that the user accepts the offer, and generating a message requesting redemption of the offer, the message comprising the offer attributes and an indication that the user qualifies to redeem the offer, where the message is digitally signed using a private key associated with the household appliance; and initiating redemption of the offer by sending the message requesting redemption of the offer to the server computer.

13. The method of claim 12, wherein the offer is valid for a certain time period starting from a time at which the connection is established.

14. The method of claim 13, wherein the offer comprises a timer that indicates an amount of the time remaining of the certain time period.

15. The method of claim 12, further comprising determining that the user qualifies to redeem the offer based on redemption qualification rules.

16. The method of claim 15, wherein determining that the user qualifies to redeem the offer based on the redemption qualification rules comprises:

determining one or more conditions to be met in relation to the user to qualify the user to redeem the offer; and verifying that the one or more conditions have been met.

17. The method of claim 12, wherein the offer attributes stored by the household appliance are digitally signed by the server computer using a private key associated with the server computer.

18. The method of claim 17, wherein the household appliance verifies the authenticity of the offer attributes using a public key associated with the server computer.

19. The method of claim 12, wherein initiating redemption of the offer further comprises storing a value associated with the offer in the household appliance in association with the user for later use.

20. The method of claim 12, wherein the household appliance comprises a thermostat, a washing machine, a drying machine, a microwave, a toaster, a blender, a refrigerator, or a television.

* * * * *